United States Patent [11] 3,592,049

| [72] | Inventor | James G. Johanski, Jr. |
| | | Walnut Creek, Calif. |
| [21] | Appl. No. | 764,371 |
| [22] | Filed | Sept. 20, 1968 |
| [45] | Patented | July 13, 1971 |
| [73] | Assignee | Safeway Stores, Incorporated |
| | | Oakland, Calif. |

[54] METHOD AND APPARATUS FOR AUTOMATIC LEAK DETECTOR
26 Claims, 5 Drawing Figs.

| [52] | U.S. Cl. | 73/45.2 |
| [51] | Int. Cl. | G01m 3/26 |
| [50] | Field of Search | 73/45.2, 45.4, 45.1, 41, 40.7, 40 |

[56] References Cited
UNITED STATES PATENTS

| 3,091,114 | 5/1963 | Webster | 73/40.7 X |
| 1,933,322 | 10/1933 | Fagan | 73/45.2 X |
| 2,013,402 | 9/1935 | Cameron | 73/45.2 |
| 2,020,535 | 11/1935 | Cameron | 73/45.2 |
| 2,551,020 | 5/1951 | Laxo | 73/45.2 |
| 3,027,753 | 4/1962 | Harder, Jr. | 73/40.7 |

*Primary Examiner*—Louis R. Prince
*Assistant Examiner*—William A. Henry, II
*Attorney*—Hill, Sherman, Meroni, Gross & Simpson ABSTRACT: A method and apparatus for automatic leak detection for use with an automatic packaging machine in which food or other materials are sealed in leak-proof packages. The packages are placed into vacuum chambers which are evacuated and gas detectors detect any leakage from the sealed packages. Packages which contain leaks are directed into a reject bin so that they may be repackaged and properly sealed to prevent spoilage.

INVENTOR
JAMES G. JOHANSKI JR.

METHOD AND APPARATUS FOR AUTOMATIC LEAK DETECTOR

BACKGROUND OF THE INVENTION

1. Field of the Invention

This invention relates in general to methods and apparatus for leak detection and, in particular, to apparatus for detecting leaks in sealed packages of foods or other articles so that they may be repackaged to prevent spoilage. 2. Description of the Prior Art Automatic packaging machines for packaging food or other articles in a preservative atmosphere are disclosed in U.S. Pat. No. 3,274,746 entitled "Method and Apparatus for Packaging Units in a Preservative Atmoshpere" which issued on Sept. 27, 1966. Such machine is capable of packaging food or other items very rapidly in a plastic sealed container. For example, the method and apparatus described in U.S. Pat. No. 3,274,746 can package 80 to 120 blocks of cheese each minute. To prevent the cheese from spoiling, an inert gas such as carbon dioxide and/or nitrogen is placed into the sealed package with the cheese. It has been observed that if a leak exists in a package the cheese will spoil and will be unsaleable at the market place.

It has been determined that with some packaging runs that approximately 1–1½ percent of the packages produced contain leaks. The current practice for detecting leaks is to selectively remove certain packages and send them to a laboratory for test purposes. The packages are then manually tested by inserting a hypodermic needle into the package and inflating it with air. The needle is then withdrawn and the tester places his finger over the needle hole and places the package into a container filled with a fluid. This is an expensive and inefficient method of testing and since it is only done on a sampling basis it does not assure that all the packages which pass through the machine are properly sealed.

SUMMARY OF THE INVENTION

The present invention comprises an automatic leak detection method and apparatus which eliminates the random checking and the manual handling of the packages and provides a continuous leakage test to which all of the packages are subjected. Thus, all of the packages which have been passed by the automatic leakage detector of this invention shall be properly sealed and the likelihood of spoilage will be greatly reduced thereby enabling spoilage losses to be substantially reduced.

The method and apparatus of the invention feeds each of the packages into a vacuum chamber which is evacuated by a vacuum pump. A gas sensor is connected to the vacuum chamber and detects gas which leaks from a leaking package. The gas sensor energizes a relay which closes an enabling switch for a reject mechanism so that when the package is ejected from the vacuum chamber it will be conveyed to a reject bin so that the wrapper may be manually stripped and the cheese block can then be repackaged.

The machine continuously operates without the handling of the packages by hand and is completely automatic. Thus, the packages may be tested very rapidly with a substantial saving in labor over present systems.

Other objects, features and advantages of the present invention will be readily apparent from the following detailed description of certain preferred embodiments thereof taken in conjunction with the accompanying drawings.

DESCRIPTION OF THE PREFERRED EMBODIMENTS

Figure 1:
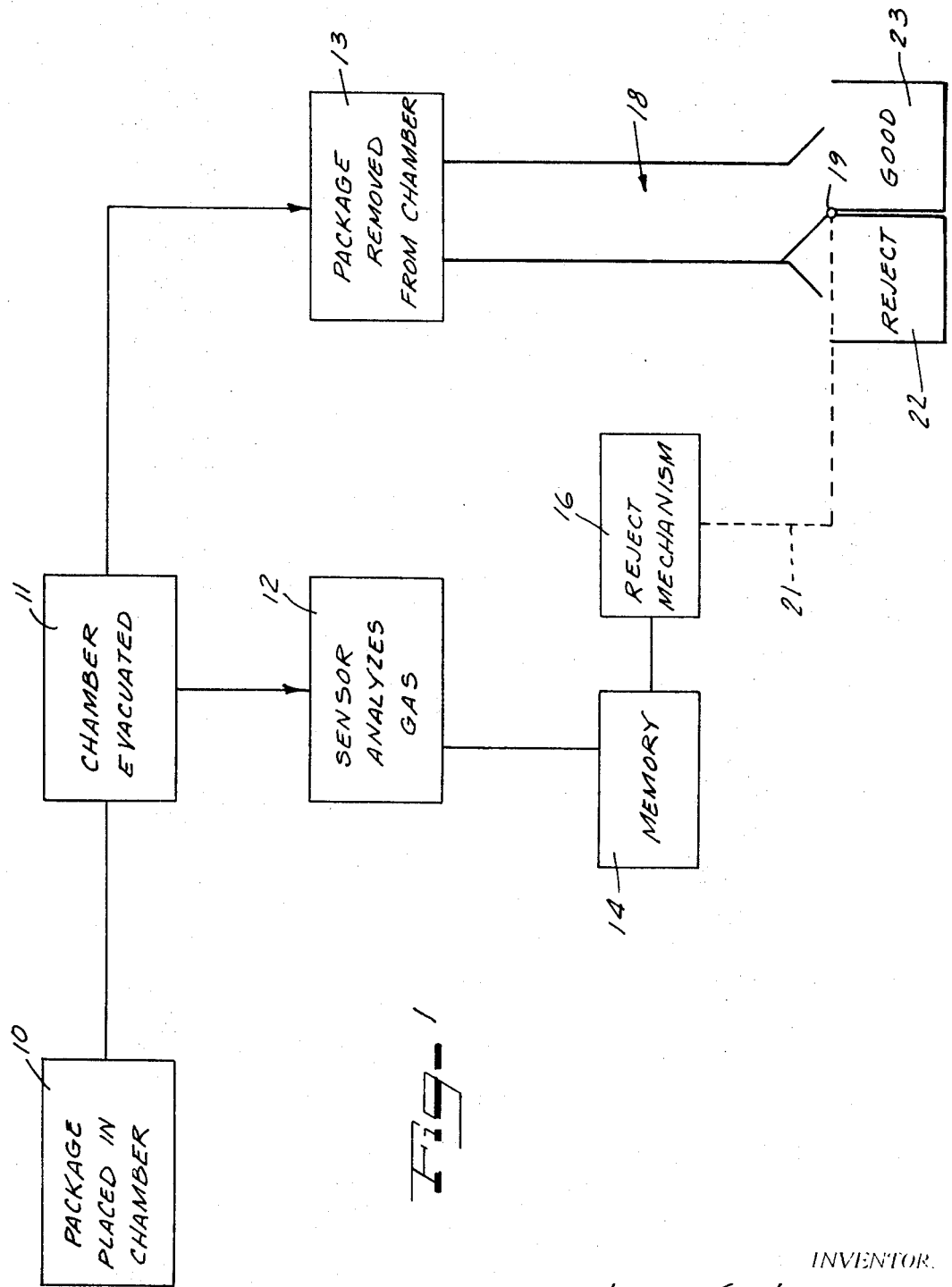
FIG. 1 is a diagrammatic view of the testing method and apparatus of this invention.

FIG. 1 is a diagrammatic view of the method and apparatus of this invention for testing packages for leakage. Sealed packages are placed in a chamber at station 10. As shown at station 11 the chamber is evacuated and a sensor 12 analyzes gas which may leak from the sealed package. If leakage occurs, the sensor provides information to a memory 14 which is connected to a reject mechanism 16. The package is removed from the chamber at 13 and supplied to an outlet chute 18 that is placed above a pair of bins 22 and 23. A door 19 is pivotally connected so that in the unenergized position it deflects the packages into the good bin 23. If the sensor 12 detects gas escaping from the package while it is in the evacuated chamber 11 the reject mechanism 16 will be energized to move the door 19 through the linkage 21 so the package passes down the chute 18 into the reject bin 22.

Figure 2:
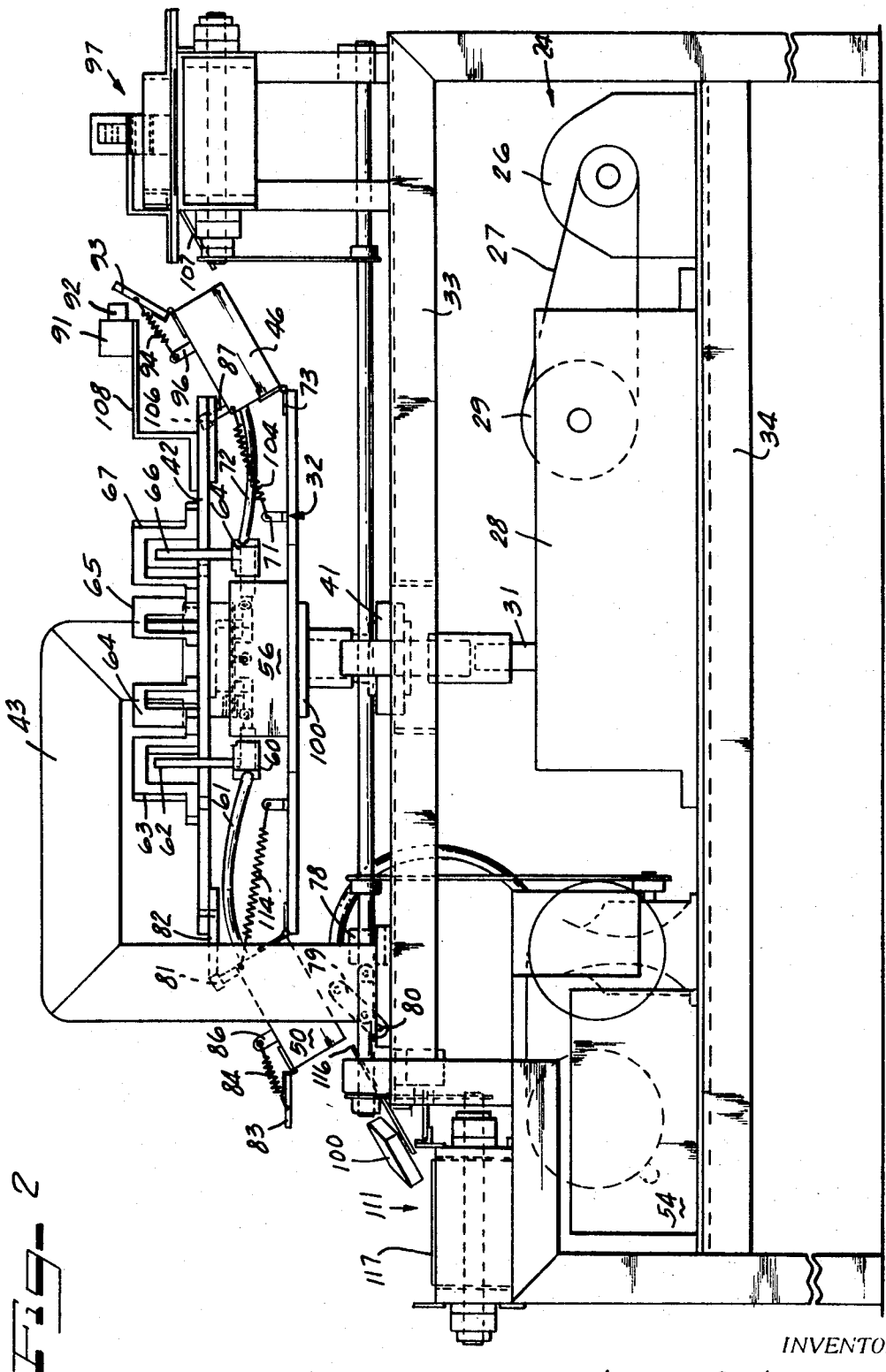
FIG. 2 is a side view of the testing machine of the invention.
Figure 3:
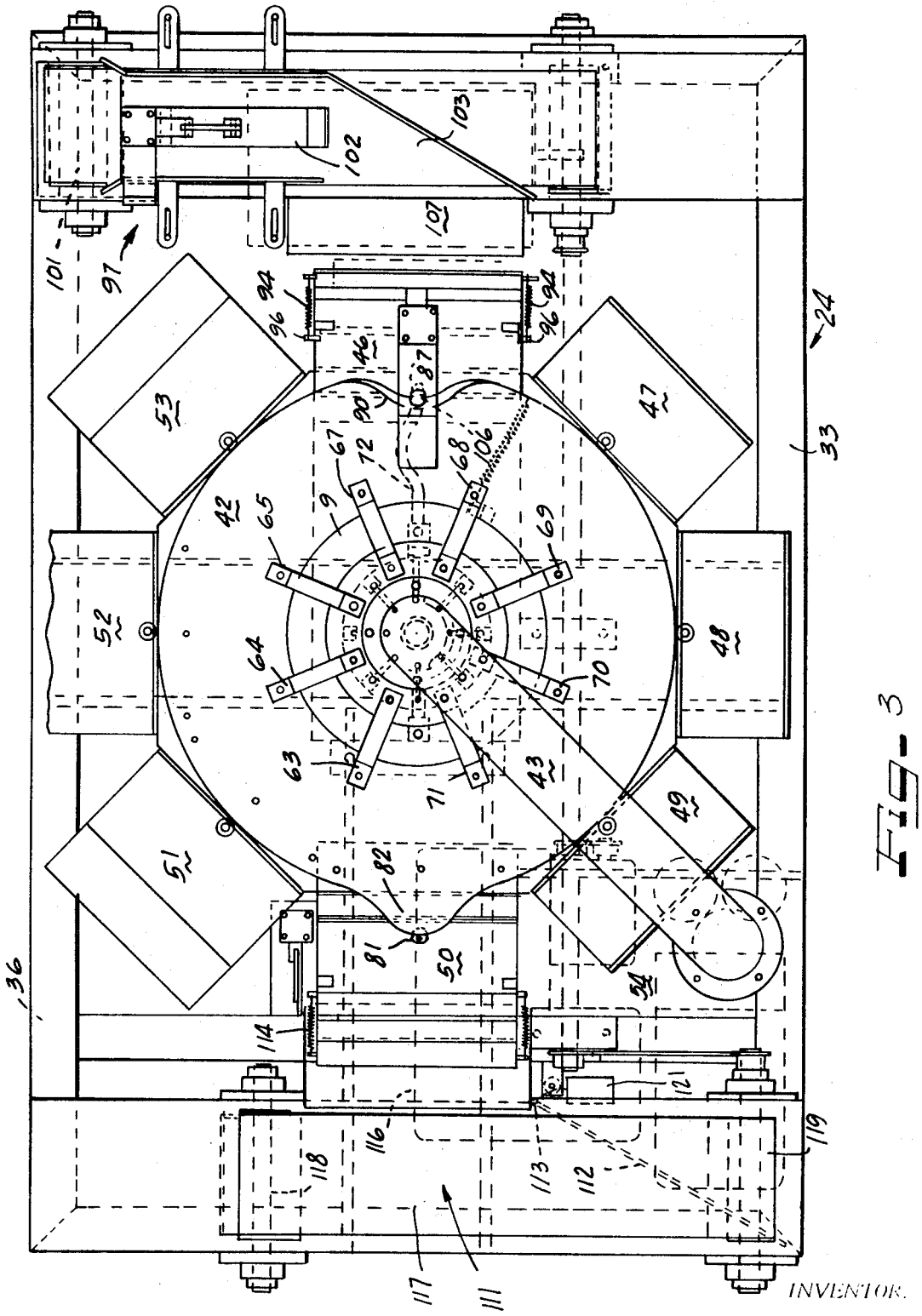
FIG. 3 is a top view of the testing machine of the invention.
Figure 4:
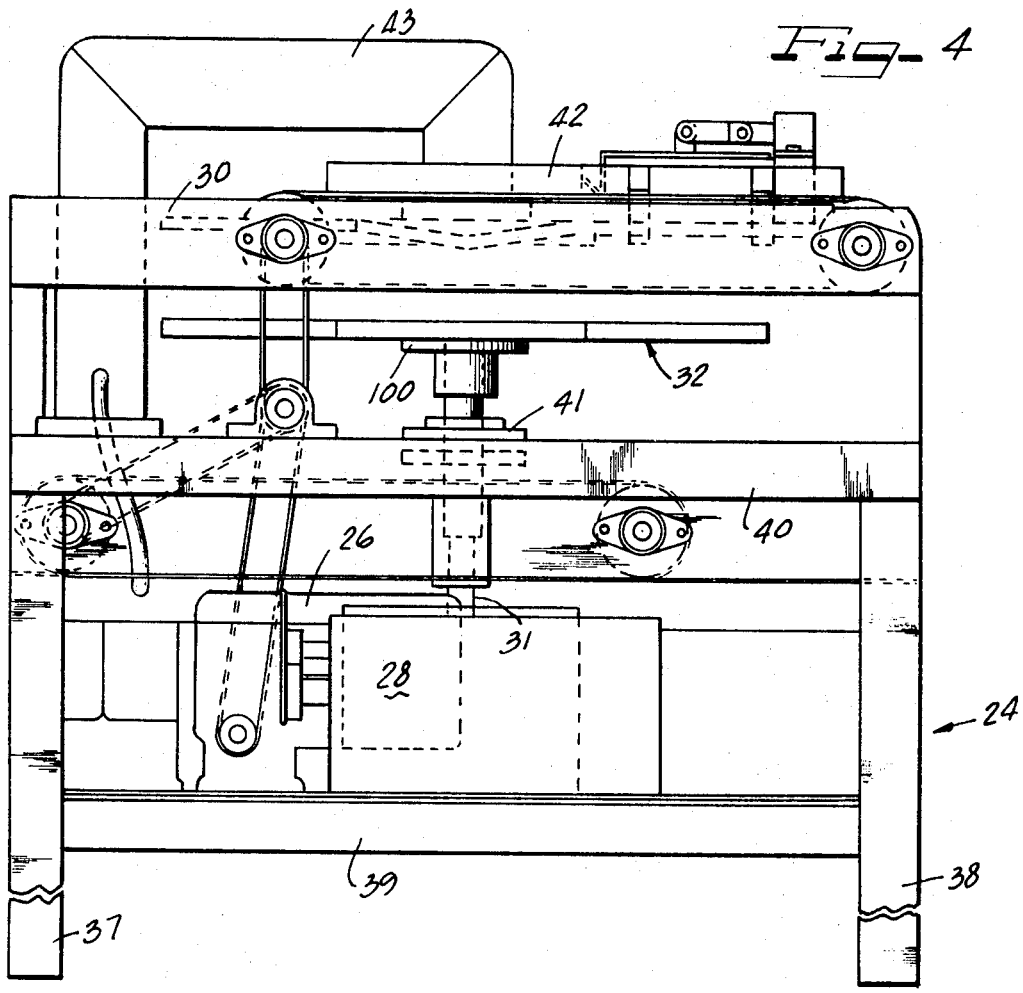
FIG. 4 is an end view of the testing machine of the invention.

FIGS. 2 through 5 illustrate the leak detecting machine of this invention. A frame member 24 has side support members 33 and 34 as best shown in FIG. 2, and end support members 30, 40 and 39 as best shown in FIG. 4.

As shown in FIG. 2, the motor 26 is mounted on the support 34 and has a drive belt 27 which drives a pulley 29 of a drive and index mechanism 28. The index mechanism 28 has an output shaft 31 that extends upwardly through a bearing 41 supported by the frame, and a turntable 32 is mounted on a hub 100 which is supported by the shaft 31. A rotary valve 56 has a first portion which is mounted on the turntable 32. A plurality of vacuum chambers 46 through 53 are attached to the edge of the turntable 32 by hinges 73 and are each connected to the first portion of rotary valve 56 by conduits which contain sensors. For example the chamber 46 has a conduit 72 that is connected to a sensor holder 64 in which a gas sensor 66 is mounted. The sensor holder 64 is connected to the rotary valve 56. The chamber 50 is connected by conduit 61 to a sensor holder 60 in which a sensor 62 is mounted. Sensor holder 60 is connected to the rotary valve 56.

A vacuum pump 54 is mounted on the frame member 34, as best shown in FIG. 2, and has an upwardly extending vacuum surge tank 43 which is connected to the stationary portion of the rotary valve 56.

A cam plate 42 is connected to the surge tank 43 above the turntable 32. The cam plate 42 is formed with a circular slot through which the sensors such as 62 and 66 extend and arches 63 through 71 allow the sensors to move around the cam plate 42.

A loading chute 97 supplies individual packages from the inlet 101 to a packages spacer 102. A solenoid is controlled by the indexing mechanism 28 so as to space packages in the chute 103 into the test chambers 46 through 53. As best shown in FIG. 2, a spring 104 is connected from a corner of the chamber 46 to a bracket 71 mounted on the turntable 32 to bias the chamber to the position shown in FIG. 2. A door 93 is held open by a pair of over-the-center springs 94 which are connected to brackets 96 mounted on the chamber 46. A cam follower 87 has a roller 106 which follows the surface of the cam plate 42.

As shown in FIG. 3, the cam plate 42 has a depression 90 adjacent the loading chute 97 which allows the chamber 46 to pivot upwardly as shown in FIG. 2 to receive a package into the chamber from the discharge chute 107. A door-closing solenoid 91 has an armature 92 which engages the door 93 to push it so that over-the-center springs 94 close the door to provide a sealed chamber. The door-closing solenoid 91 is mounted with a bracket 108 to the cam plate 42. It is to realized that the door-closing solenoid is energized by the indexing mechanism 28 after the package has been placed into the chamber 46. The chamber then moves to the horizontal position because the cam follower 106 passes out of the depression 90 and rides on the edge of the cam plate 42. As the chamber 46 rotates with the turntable 32, the rotary valve 56 connects the vacuum pump 54 through the vacuum tank 43 to the conduit 72. This will evacuate the chamber 46 of air which entered the chamber when the door 93 was opened. As the turntable 32 moves the chamber 46 from the inlet chute 97 to an outlet chute 111 on the other side of the machine, the sensor 66 will detect leaking of any of the gas within the sealed package in the chamber 46. For example, if the gas in the package is nitrogen, the sensor 66 will be a nitrogen-sensing device of conventional type and will cause a reject door 112 which is pivoted to the machine at point 113 to be energized to deflect the package into a reject chute.

FIG. 2 illustrates a chamber 50 which has passed 180 degrees around the machine and is in the discharge position. The door 83 has been opened by solenoid 78 which moves a linkage 79 that is pivotally attached by pin 80 to the machine. The upper end of the link 79 engages the lower portion of the door which extends beyond the edge of the chamber 50 and causes it to move up to the position shown in FIG. 2. Simultaneously the cam follower 81 engages the projection 82 (see FIG. 3) of the cam plate 42 which causes the chamber 50 to be pivoted downwardly against the spring 114, as shown. This causes the package 100 to pass down the deflector 116 onto the conveyor belt 117 which is driven by rollers 118 and 119 which are suitably coupled to the motor 26.

The reject gate 112 is energized by a solenoid 121 if the sensor 62 detected any leaking gas. This causes the deflector 112 to move to the position shown in FIG. 3 in dotted line to cause the package 100 to be moved transversely of the belt 117 into a reject container. If the sensor did not detect any gas, the reject deflector 112 will not engage the package and it will pass over the roller 119 into a bin which receives the good packages. Although solenoids 78 and 121 are disclosed, it is to be realized that there may be fluid operated cylinders.

As best shown in FIG. 3, as the chambers 46—53 pass from the discharge chute 111 to the loading chute 97 the doors of the chambers remain open due to the over-the-center springs. In FIG. 3, the chamber 46 is receiving a package and chamber 53 will be next in position to receive a package. The chambers 47, 48 and 49 are being evacuated and tested for leakage and chamber 50 is being emptied. The chambers 51, 52 and 53 are empty with the doors open and are moving to the loading chute 97.

Figure 5:
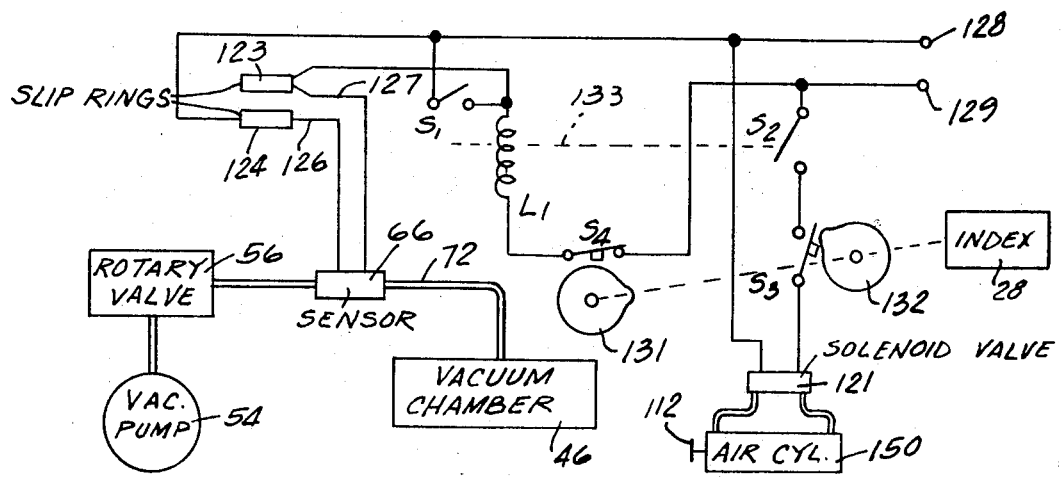
FIG. 5 is a schematic view of the control system of the invention.

FIG. 5 illustrates the electrical schematic for the system. The rotary valve 56 connects the conduit 72 and the sensor 66 to the vacuum chamber 46, for example. The vacuum pump 54 evacuates the chamber 46 and the sensor 66 detects the presence of any leakage of gas which is within the package in the chamber 46. Slip rings 123 and 124 are mounted on shaft 31 and brushes 126 and 127 are connected to the sensor 66. Power terminal 128 is also connected to the slip ring 124 and to one side of a normally open hold-in switch $s_1$. The other side of the hold-in switch $S_1$ is connected to one side of a relay coil $L_1$ which also connected to the slip ring 123. The other side of the relay coil $L_1$ is connected to a normally closed switch $S_4$ which has its opposite side connected to the power terminal 129. The reject solenoid 121 has one side connected to lead 128 and the other side connected to normally open switch $S_3$. The other side of the switch $S_3$ is connected to one side of a normally open switch $S_2$ which has its opposite side connected to power lead 129. A pair of cams 131 and 132 are controlled by the indexer 28 and control switches 54 and 53.

In operation, if the sensor 66 detects gas in the package within the vacuum chamber 46, it will form a closed circuit thus energizing the relay coil $L_1$. The relay coil $L_1$ will be energized until the leaking package is rejected. Thus, the closed switch $S_2$ cocks the reject mechanism. The cam 132 closes the switch $S_3$ and causes the solenoid 46 to energize the air cylinder 150 which moves the door 112 to the reject position. The solenoid 121 could directly move the reject means 112 if desired.

It is to be realized that the sensor of each chamber is connected by the indexer 28 to the reject relay $L_1$ in sequence as each chamber is tested. At the same time, the rotary valve 56 connects each chamber to the vacuum pump 54. The sensing dwell time of the invention may be 83/100ths of one second so very rapid testing may be accomplished. In a packaging line for packaging cheese, it is anticipated that 50 to 120 packages may be tested per minute depending on the operating speed of the packaging machine. It will be appreciated that a conveyor may be employed to convey the cheese packages from the packaging machine to the loading chute 97 of the leak detector where each package is therefore individually tested. According to important features of this invention, it is contemplated that the leak detector method can be used in an overall production method whereby important cost savings can be obtained. To this end, it is contemplated that bulk cheese can be cut into consumer size units and fed into a conventional packaging machine such as a Campbell Wrapper or a Hayssen R.T. machine, the latter being illustrated in U.S. Pat. No. 3,274,746. If desired, the thus packaged unit can be conveyed to a weighing and labeling apparatus as shown in my companion copending application entitled "Packaging Machine Having An In Line Automated Multistation Weighing and Labeling Apparatus," U.S. Ser. No. 690,526 filed Dec. 14, 1967. Previously, after the sealed packages were formed, it was the practice to place them in over-wrapped cartons, to refrigerate the cartons, and to then ship them to the market place.

It is contemplated that my new method can be used singly or in combination with the aforesaid packaging machine and if desired also with my weighing and labeling machine.

In other words, my production line method includes the steps of packaging units in sealed packages, weighing and labeling the sealed packages, then conveying the sealed packages to the testing area and individually pulling a vacuum on each package with sufficient force to withdraw atmosphere from the interior of the package if the package be a leaker but without rupturing any seals or the wall of the package while contemporaneously sensing the presence of leaked atmosphere and transmitting a signal to a downstream point in the event a leaker is sensed. The packages are then discharged from the vacuumized area or the vacuum chambers and are caused to flow in a stream away from the testing area. The sensed leakers in the stream of tested packages are diverted from the stream in accordance with the signals transmitted from the vacuumizing area, and the remaining packages are then placed in packages for shipment to the market place. My novel contribution to the method just described is the subject of this application concerning its self with the method of leak detection and the removal of leakers from the production line. This method is believed to be novel in and of itself and also in combination with the other product line steps just described.

I claim as my invention:

1. A machine for automatically detecting leaks in sealed packages of flexible material having a product and a gaseous atmosphere sealed therein comprising, a feed mechanism supplying said sealed flexible packages to the machine, a test chamber receiving the sealed flexible packages from said feed mechanism, means for decreasing the pressure within said test chamber to force gaseous atmosphere from leaky packages, detecting means for detecting the presence of gaseous atmosphere leaked from said packages within said test chamber and generating a nonmechanical signal when a leaky package is sensed, means operated by said nonmechanical signal for storing the nonmechanical signal and means operated by the stored nonmechanical signal for performing an operation on leaky packages to indicate which of said sealed packages are leaky packages.

2. A machine for automatically detecting leaks in sealed packages according to claim 1 wherein said means operated by the nonmechanical signal includes means for rejecting leaking packages.

3. A machine for automatically detecting leaks in sealed packages according to claim 2 wherein said feed mechanism includes spacing means for furnishing one package at a time to the machine.

4. A machine for automatically detecting leaks in sealed packages according to claim 3 together with movable chamber support means for moving the test chamber between an infeed position for receiving sealed packages from the feed mechanism and a discharge position.

5. A machine for automatically detecting leaks in sealed packages according to claim 4 together with a plurality of additional test chambers mounted on the chamber support means and movable in sequence between said infeed and discharge positions, wherein said means for decreasing the pressure connected to said first named test chamber includes means for decreasing the pressure to each additional test chamber, and wherein the detecting means includes means for detecting the presence of gaseous atmosphere leaked from the packages in said additional test chambers.

6. A machine for automatically detecting leaks in sealed packages according to claim 5 wherein said chamber support means comprises a turntable.

7. A machine according to claim 6 wherein said means for decreasing pressure comprises a vacuum pump, a rotary valve connected to said vacuum pump, and a plurality of conduit means connected between said rotary valve and the test chambers.

8. A machine according to claim 7 wherein said detecting means includes a gas detector in each test chamber, a source of electrical power and means for selectively connecting said source of power to said detectors.

9. A machine for automatically detecting leaks in sealed packages according to claim 8 wherein each of said test chambers includes an opening and a door mounted on the test chamber movable between open and closed positions with respect to said opening together with means for operating said doors at the discharge position to permit the discharge of sealed packages therefrom.

10. A machine according to claim 9 wherein said means for operating said doors includes a plurality of over-the-center springs for holding said doors closed or opened.

11. A machine according to claim 9 wherein said means for operating said doors to open the same includes a solenoid.

12. A machine according to claim 9 wherein said means for operating said doors to close the same includes a solenoid.

13. A machine according to claim 9 wherein said test chambers are pivotally mounted on said turntable about the periphery thereof.

14. A machine according to claim 13 wherein said test chambers are generally supported horizontally, together with means for tilting the test chambers so that the openings face upwardly adjacent the infeed position, and means for tilting the test chambers so that the openings face downwardly in the discharge position.

15. A machine according to claim 14 wherein said means for tilting the test chambers includes a cam plate mounted adjacent the turntable, a plurality of cam followers mounted on the test chambers and engageable with the cam plate together with means for moving the turntable.

16. Apparatus for automatically detecting leaks in sealed packages having a gaseous atmosphere therein sealed in flexible packaging material comprising: a test station; means for feeding the sealed packages to said test station; a test chamber at said test station for receiving the sealed packages from said feeding means; means for drawing a vacuum within said test chamber on the exterior of a sealed package to withdraw gaseous atmosphere from a leaky package; means for detecting the presence of gaseous atmosphere from said packages within said test chamber and generating a nonmechanical signal; means for discharging packages from said test chamber; means operated by said nonmechanical signal for storing the nonmechanical signal; and means spaced from said test chamber operating in response to said stored signal for rejecting leaky packages.

17. In apparatus for testing sealed packages, each having a product and a gaseous atmosphere sealed therein with a flexible packaging material,
means for advancing the sealed packages,
housing means for enclosing at least one sealed package,
means for moving said housing means so that it encloses said one sealed package for a predetermined period of time, means for applying a vacuum to said housing means while it encloses said one sealed package so that a pressure is created in the housing means which is substantially less than within said one sealed package,
whereby the gaseous atmosphere within a sealed package having a leak therein will flow therefrom into the housing means, sensing means connected to the housing means for sensing when any of the gaseous atmosphere escapes from a package within the housing means,
said sensing means generating a nonmechanical signal when a leaky package is sensed within the housing means, means operated by the nonmechanical signal from the sensing means for storing the nonmechanical signal, means connected to the means for storing and spaced from the housing means for performing an operation on said leaky packages after said leaky packages are removed from said housing means to indicate which of said sealed packages are leaky packages.

18. Apparatus as in claim 17, wherein said sealed packages are advanced step by step.

19. Apparatus as in claim 17, wherein said means for performing an operation includes means for ejecting the leaky packages from the sealed packages as they are advanced.

20. Apparatus as in claim 17, wherein the product is cheese and wherein the apparatus is capable of handling at least 80 sealed packages per minute.

21. Apparatus as in claim 17, wherein said sensing means moves with said housing means.

22. Apparatus as in claim 17, wherein said means for moving said housing means includes means for moving said housing means repeatedly past said means for advancing the sealed packages to receive packages therefrom, said housing means including a door movable between open and closed positions, and means for operating said door in synchronism with movement of the means for moving said housing means.

23. In a machine for testing sealed packages having a product and a gas sealed within flexible packaging material,
means for advancing the sealed packages,
a turntable disposed in a substantially horizontal plane,
a plurality of vacuum chambers, each of said vacuum chambers having an opening and including a door movable between open and closed positions with respect to said opening,
means mounting said vacuum chamber on said turntable in spaced apart positions,
means for rotating said turntable so that the vacuum chambers are advanced past the means for advancing the sealed packages,
means for causing the door of each of said vacuum chambers to be opened as it moves past the means for advancing the sealed packages,
means for advancing at least one sealed package into each vacuum chamber as its door has been moved toward an open position,
means for closing the door of each vacuum chamber after it has received a sealed package,
means for applying a vacuum to each vacuum chamber after it has received a sealed package so that a pressure is provided in the vacuum chamber which is less than pressure of the gas in the sealed package whereby gas in the package will escape into the chamber if the sealed package has a hole therein,
sensing means for each vacuum chamber for sensing the presence of said gas,
means for causing the doors of said vacuum chambers to open and for causing the sealed packages therein to be discharged and means responsive to said sensing means for causing any sealed package having a hole therein to be ejected.

24. A machine as in claim 23, wherein said means mounting said vacuum chambers on said turntable include hinge means permitting swinging movement about substantially horizontal axes, means for causing said chambers to be moved so that their openings face upwardly during the time the sealed packages are advanced into the vacuum chambers and face downwardly during the time the sealed packages are discharged therefrom.

25. A high speed method of leak testing a production run of packages each having a unit and a gas sealed in flexible packaging material, comprising the steps of merging a stream of sealed packages with an endless series of vacuum chambers, loading the packages into the vacuum chambers, placing a vacuum of each of the vacuum chambers so that pressure of the gas in the sealed package exceeds the pressure surrounding the sealed package whereby gas will escape from a package in the event of a leak in a package, sensing any gas leaked from any one of the sealed packages, separating the sealed packages from the vacuum chambers to form a stream of packages, generating a signal upon sensing the leaked gas, transmitting the signal to a downstream point with regard to each package which has a leak therein, storing the signal until the corresponding package which has a leak therein reaches the downstream point, and diverting the corresponding package which has a leak therein from the stream of packages.

26. A method of continuously producing leak-free film pouches having a perishable food product and a controlled atmosphere sealed therein, comprising the steps of:

continuously feeding the sealed pouches to a test chamber;

drawing a vacuum on the individual sealed packages while they are within the test chamber to withdraw controlled atmosphere from any leaky pouch;

detecting the presence of the leaked atmosphere within the test chamber;

generating a nonmechanical signal in response to each leak detection;

storing the signal;

continuously discharging the pouches from the test chamber; and rejecting leaky pouches downstream of the test chamber in response to stored signals.